United States Patent
Park et al.

(10) Patent No.: US 7,220,711 B2
(45) Date of Patent: May 22, 2007

(54) METHOD FOR MANUFACTURING OUTSOLE FOR FOOTWEAR WITHOUT APPLYING EXTERNAL MOLD LUBRICANT ONTO MOLD, AND FORMULATING COMPOSITION THEREFOR

(76) Inventors: Hee-Dae Park, 410-10, Yonsan-9dong, Yonje-ku, Pusan 611-089 (KR); Yagnick Metha, 665 Martin St., Rahway, NJ (US) 07065

( * ) Notice: Subject to any disclaimer, the term of this patent is extended or adjusted under 35 U.S.C. 154(b) by 475 days.

(21) Appl. No.: 10/203,994

(22) PCT Filed: Feb. 8, 2001

(86) PCT No.: PCT/KR01/00182

§ 371 (c)(1),
(2), (4) Date: Aug. 15, 2002

(87) PCT Pub. No.: WO02/49822

PCT Pub. Date: Jun. 27, 2002

(65) Prior Publication Data

US 2003/0013616 A1    Jan. 16, 2003

(30) Foreign Application Priority Data

Dec. 20, 2000    (KR) ................. 2000-79019

(51) Int. Cl.
*C10M 159/22*   (2006.01)
*C08G 18/77*    (2006.01)
(52) U.S. Cl. ............. 508/459; 508/461; 508/535; 508/536; 508/539; 508/421; 524/115; 524/147; 524/284; 524/394; 36/25 R

(58) Field of Classification Search ........... 524/115, 524/147, 284, 294; 508/459, 535, 536, 539, 508/421, 461; 36/25 R
See application file for complete search history.

(56) References Cited

U.S. PATENT DOCUMENTS

| | | | | | |
|---|---|---|---|---|---|
| 4,111,875 A | * | 9/1978 | Uva | ............ | 523/167 |
| 4,418,483 A | * | 12/1983 | Fujita et al. | ............ | 36/28 |
| 4,545,927 A | * | 10/1985 | Railsback | ............ | 252/511 |
| 5,716,723 A | * | 2/1998 | Van Cleef et al. | ............ | 428/690 |

* cited by examiner

*Primary Examiner*—Cephia D. Toomer
(74) *Attorney, Agent, or Firm*—Notaro & Michalos PC

(57) ABSTRACT

Disclosed are a method for manufacturing an outsole for shoes without applying an external mold release agent or mold lubricant onto a mold, and a formulating composition used at manufacturing a rubber outsole. One composition of an internal mold lubricant for manufacturing an outsole for use in footwears is consisting of highly branched hydrocarbon having molecular weight of 400 to 2800, carboxylic acid, metal salts of carboxylic acids, and phospholipids containing heat stable lecithin, Another composition of an internal mold lubricant for manufacturing an outsole for Use in footwears Is consisting of branched hydrocarbon having molecular weight of 800 to 2000, carboxylic acid, long chain carboxylic acids having molecular weight of 200 to 800, metal complex of rang chain carboxylic acids having molecular weight of 200 to 800, and ionomer.

4 Claims, No Drawings

METHOD FOR MANUFACTURING OUTSOLE FOR FOOTWEAR WITHOUT APPLYING EXTERNAL MOLD LUBRICANT ONTO MOLD, AND FORMULATING COMPOSITION THEREFOR

FIELD OF THE INVENTION

The present invention relates generally to a method for manufacturing an outsole for use in footwear articles, and more particularly to a method for manufacturing an outsole for shoes without applying a mold release agent or mold lubricant onto a maid, and a formulating composition used at manufacturing a rubber outsole.

Wherein, a term external mold lubricant means a composition to be used for directly applying onto a mold, and a term internal mold lubricant means a composition to be used for mixing with a composition for manufacturing an outsole.

DESCRIPTION OF THE PRIOR ART

Generally, in the field of the footwear article, a substrate comprising ethylene vinyle acetate copolymer, 1,2-polybutandiene rubber, natural rubber, styrene-butadiene rubber, butadiene rubber, or the like, or a polymer composed of the above materials is compressed-shaped by a press molding process to manufacture an outsole for a footwear article. The press molding process is well known in the art, and so the full description thereof will be shortened. In addition, the process is disclosed in Korean Patent Laid-Open Publication Nos. 2000-1970 entitled method for manufacturing outsole for footwears and apparatus therefor, and 94-701327 entitled method for manufacturing outsole for shoe.

When the outsole is made by the above press molding process, a mold rublicant must be applied onto an inside of the mold, before a polymer is poured into the mold. The reason is that the outsole is easily released from the mold. Specifically, after a soluble external mold lubricant is applied onto an inner surface of the mold, the releasing process is achieved by repeating in a cycle of 10~20 (in case of a white master batch) or in a cycle of 20~30 (in case of a carbon master batch), in order to manufacture the outsole.

A composition of the external mold lubricant and a method thereof are disclosed in Korean Patent Laid-Open Publication Nos. 97-487 entitled soluble silicon resin mold lubricant and method thereof, and 94-701327 entitled mold lubricant. And also, it is disclosed in Korean Patent Publication No. 244586 entitled soluble mold lubricant and method thereof.

If the outsole is made by means of the mold lubricant as described above, it causes the mold to be contaminated and corroded. Also, since the rubber is built up in the mold, the mold has to be cleaned often. In addition, there is an adhesive problem of the outsole caused by an ununiform dispersion of the mold lubricant. Further, the use of the mold lubricant needs an apparatus for applying the mold lubricant, and increases the step of applying it.

DISCLOSURE OF THE INVENTION

Therefore, in order to solve the problems involved in the prior art, it is a first object of the present invention to provide a composition of internal mold lubricant capable of manufacturing an outsole for use in footwears without using an external mold lubricant.

A second object of the present invention is to provide a formulating composition added with an internal mold lubricant.

A third object of the present invention is to provide a formulating composition capable of manufacturing a rubber outsole for used in footwears without using an external mold lubricant.

A fourth object of the present invention to provide a method for manufacturing an outsole for use in footwears without using a mold lubricant, and to an outsole manufactured thereby.

In order to achieve the above objects, according to one aspect of the present invention, there is provided a composition of an internal mold lubricant for manufacturing an outsole for use in footwears, the composition consisting of highly branched hydrocarbon having molecularweight of 400 to 2800, carboxylic acid, metal salts of carboxylic acids, and phospholiplds containing heat stable lecithin.

According to other aspect of the present invention, there is provided a composition of an internal mold lubricant for manufacturing en outsole for use in footwears, the composition consisting of branched hydrocarbon having molecular weight of 800 to 2000, carboxylic acid, long chain carboxylic acids having molecular weight of 200 to 800, metal complex of long chain carboxylic acids having molecular weight of 200 to 800, and ionomer.

According to another aspect of the present invention, there is provided a method for manufacturing an outsole for use in footwears, the method comprising the steps of: 1) mixing a polymer in an amount by weight of 100 parts, a filler, and other additives in an amount by weight of 160 to 180 parts; 2) preparing an accelerating agent consisting of at least one selected from mercaptobenxothiazole, dibensothiazyl disulfide, tetramethylthiurm monosulfide, soluble sulfur, and insoluble sulfur; and 3) mixing the accelerating agent in an amount by weight of 3 to 8 parts with the composition obtained from the step 1.

According to further another aspect of the present invention, there is provided a formulating composition for manufacturing a rubber outsole for use in footwears, the composition consisting of ethylene-propylene copolymer of 10 to 25 wt. %, ethylene-propylene dinemonomer of 0.5 to 3.0 wt. %, high fatty acid unsaturated compounds of 0.1 to 1.0 wt. %, internal mold lubricant of 1.0 to 4.0 wt. %, and a compound of 50 to 80 wt. % selected from a group consisting of mercaptobenxothiazole, dibensothiazyl disulfide, tetramethyithiurm monosulfide, soluble sulfur, and insoluble sulfur.

The formulating composition means an accelerating agent, a filler or an additive.

Preferably, the internal mold lubricant comprises TL-700L™ and TL-770™.

BEST MODE FOR CARRYING OUT THE INVENTION

Now, preferred embodiments of the present invention will be described in detail.

According to teachings of the present invention, an outsole for footwears is manufactured by a compression or injection molding process by not applying a soluble external mold lubricant onto a mold of steel/aluminum. In particular, a formulating composition added with an internal mold lubricant according to the present invention may prevent the contamination and corrosion of a mold when manufacturing the outsole, as well as achieving the uniform dispersion of a formulating composition and improving the adhesive force thereof.

According to a method for manufacturing an outsole according to the present invention, firstly, it prepares a substrate of polymer preferably consisting of natural rubber (NR) and butadiene rubber (BR). And, the substrate in an amount by weight of 100 parts is mixed with a filler and an additive in an amount by weight of 160 to 180 parts. Then, the mixture is agitated by an agitator called as Bam Burry (B/B). The filler comprises carbon black, zinc oxide, stearic acid, phenol-class, and paraffine oil, and the additive comprises white carbon, polyethylene glycol, silane coupling agent.

In order to manufacture the outsole by not applying soluble mold lubricant onto the inside of the mold, the agitated mixture by the B/B is added with an accelerator in an amount by weight of 3 to 8 parts. The accelerator is classified into four kinds, so that the accelerator may be used separately or blended with each other depend upon an application of the outsole and a manufacturing method thereof.

The composition of the accelerator is consisting of ethylene-propylene copolymer (EPR), ethylene-propylene dinemonomer (EPDM), and high fatty acid unsaturated compound (#212), and, if necessary, oil may be added to the composition. The accelerator is added with mercaptobenzothiazole (M), dibensothiazyl disulfide (DM), tetramethylthiurm monosulfide (TS), soluble sulfur (S), and insoluble sulfur (IS), these materials being added into the accelerator in an amount of 50 to 85 wt. %.

In particular, since the accelerator is mainly consisting of the internal mold lubricant, it can manufacture the outsole without applying other mold rubficant onto the mold. In order words, when manufacturing the outsole, if the accelerator, of which is added with the internal mold lubricant, is used, it can achieve the above advantages. The internal mold lubricant is classified into two kinds, so that it may be used separately or added into the filler or additive.

For example, firstly, the internal mold lubricant is consisting of highly branched hydrocarbon having molecular weight of 400 to 2800, carboxylic acid, metal salts of carboxylic acids, and phospholipids containing heat stable lecithin.

Secondly, the internal mold lubricant is consisting of branched hydrocarbon having molecular weight of 800 to 2000, carboxylic acid, long chain carboxylic acids having molecularweight of 200 to 800, metal complex of long chain carboxylic acids having molecular weight of 200 to 800, and ionomer.

Embodiments of the present invention are given below by way of illustration and not by way of limitation.

Embodiment 1

An internal mold lubricant was prepared by mixing highly branched hydrocarbon, having molecular weight of 400 to 2800, of 10 to 75 wt. %, carboxylic acid (saturated/unsaturated-straight or isomer having molecular weight of 170 to 700) of 5 to 50 wt. %. metal salts of carboxylic acids of 5 to 30 wt. %, and phospholipids containing heat stable lecithin of 10 to 60 wt. %. Hereinafter, the internal mold lubricant will be referred as TL-700L™.

Embodiment 2

An internal mold lubricant was prepared by mixing branched hydrocarbon, having molecular weight of 800 to 2000, of 10 to 60 wt. %, long chain carboxylic acid, having molecular weight of 200 to 800, of 5 to 50 wt. %, metal complex of long chain carboxylic acids, having molecular weight of 200 to 800, of 15 to 50 wt. %, and ionomer of 5 to 25 wt. %. Hereinafter, the internal mold lubricant will be referred as TL-450M™.

Embodiment 3

An accelerator was prepared by mixing EPR of 10.7 wt. %, EPDM of 1.7 wt. %, #212 of 0.3 wt. %, TL-700 of 14.6 wt. %, and M of 72.8 wt. %. Hereinafter, the accelerator will be referred as A type-MBT75 M/B Embodiment 4

An accelerator was prepared by mixing EPR of 18.4 wt. %, EPDM of 2.1 wt. %, #212 of 0.3 wt. %, oil of 3.4 wt. %, TL-450 of 3.0 wt. %, and M of 72.8 wt. %. Hereinafter, the accelerator will be referred as B type-MBT75 M/B Embodiment 5

An accelerator was prepared by mixing EPR of 11.1 wt. %, EPDM of 1.3 wt. %, #212 of 0.3 wt. %, TL-700L of 14.6 wt. %, and DM of 72.8 wt. %. Hereinafter, the accelerator will be referred as A type-MBTS75 M/B Embodiment 6

An accelerator was prepared by mixing EPR of 15.4 wt. %, EPDM of 2.0 wt. %, #212 of 0.3 wt. %, oil of 6.5 wt. %, TL-450 of 3.0 wt. %, and DM of 72.8 wt. %. Hereinafter, the accelerator will be referred as B type-MBTS75 M/B Embodiment 7

An accelerator was prepared by mixing EPR of 9.4 wt. %, EPDM of 1.2 wt. %, #212 of 0.2 wt. %, TL-700L of 14.9 wt. %, and TS of 74.3 wt. %. Hereinafter, the accelerator will be referred as A type TMTM75 M/B™.

Embodiment 8

An accelerator was prepared by mixing EPR of 18.2 wt. %, EPDM of 2.3 wt. %, #212 of 0.3 wt. %, oil of 1.2 wt. %, TL-450M of 3.0 wt. %, and TS of 75 wt. %. Hereinafter, the accelerator will be referred as B type-TMTM75 M/B ™.

Embodiment 9

An accelerator was prepared by mixing EPR of 3.8 wt. %, EPDM of 0.5 wt. %, #212 of 0.2 wt. %, TL-700L of 14.6 wt. %, S of 40.2 wt. %, and IS of 40.8 wt. %. Hereinafter, the accelerator will be referred as A type-IS75S M/B ™.

Embodiment 10

An accelerator was prepared by mixing EPR of 12.1 wt. %, EPDM of 1.1 wt. %, #212 of 0.4 wt. %, TL-450M of 3.0 wt. %, S of 41.4 wt. %, and IS of 42.0 wt. %. Hereinafter, the accelerator will be referred as B type-IS75S M/B ™.

Embodiment 11

In the B/B, a polymer of 100 wt. %, wherein the polymer is consisting of NR of 25 wt. % and BR of 75 wt. %, is mixed with carbon black of 60 wt. %, zinc oxide of 4.0 wt. %, stearic acid of 1.0 wt. %, phenol-class of 2.0 wt. %, and paraffine oil of 8.0 wt. %, and then, the mixture is agitated by the B/B. And again, the mixture is mixed with A type-MB75 M/B of 0.29 wt. %, A type-MBTS75 M/B of 2.20 wt. %, A type-TMTM75 M/B of 0.09 wt. %, and A type-IS75S M/B of 2.5 wt. %.

After the composition is poured into the mold without applying the mold lubricant onto the inside of the mold, the composition was shaped by a compression molding, thereby manufacturing an outsole (carbon master batch) (trademark: ORS-017).

Embodiment 12

In the B/B, a polymer of 100 wt. %, wherein the polymer is consisting of NR of 11.10 wt. %, BR of 77.80 wt. %, and nitrile butadiene rubber of 11.10 wt. %, is mixed with white carbon of 41.70 wt. %, zinc oxide of 6.20 wt. %, stearic acid of 1.0 wt. %, polyethylene glycol of 3.30 wt. %, phenol-class of 1.70 wt. %, silane coupling agent of 2.20 wt. %, and paraffine oil of 5.60 wt. %, and then, the mixture is agitated by the B/B. And again, the mixture is mixed with B type-MB75 M/B of 0.3 wt. %, B type-MBTS75 M/B of 2.10 wt. %, B type-TMTM75 M/B of 0.10 wt. %, and B type-IS75S M/B of 2.5 wt. %.

After the composition is poured into the mold without applying the mold lubricant onto the inside of the mold, the composition was shaped by a compression molding, thereby manufacturing an outsole (carbon master batch) (trademark: ORS-018).

Although some preferred embodiments have been described, many modifications and variations may be made thereto in the light of the above teachings. It is therefore may be practiced otherwise than as specifically described.

INDUSTRIAL APPLICABILITY

With the composition as described above, many effects may be achieved as followings:

There is no a separate apparatus for applying a mold lubricant, and a process of applying it may be omitted. In addition, times of sanding/plating of a mold may be reduced.

Since a soluble mold lubricant does not use, it can prevent the contamination and corrosion of the mold, thereby extending a cycle of cleaning the mold and reducing a manufacturing cost.

The present invention eliminates a factor of excessive application of a mold lubricant, thereby improving a poor contact between the mold and the composition.

Since the composition may be well mixed with a rubber, it reduces the mechanical wear, and increases the durability of the apparatus.

Since the composition may be well mixed with a rubber, it improves an uniform dispersion and an adhesive force, thereby increase the physical property of the rubber.

The invention claimed is:

1. A composition of an internal mold lubricant for manufacturing an outsole for use in footwear, the composition consisting of a branched hydrocarbon having molecular weight of 400 to 2800, a carboxylic acid, metal salts of carboxylic acids, and phospholipids containing heat stable lecithin.

2. A composition of an internal mold lubricant for manufacturing an outsole for use in footwear, the composition consisting of a branched hydrocarbon having molecular weight of 800 to 2000, long chain carboxylic acids having molecular weight of 200 to 800, a metal complex of long chain carboxylic acids having a molecular weight of 200 to 800, and an ionomer.

3. A method for manufacturing an outsole for use in footwear, the method comprising the steps of:
mixing a composition of internal mold lubricant with a composition of a footwear;
forming the mixture to manufacture the outsole and
forming an outsole from the mixture and wherein the composition of internal mold lubricant consists of a branched hydrocarbon having molecular weight of 400 to 2800, a carboxylic acid, metal salts of carboxylic acids, and phospholipids containing heat stable lecithin.

4. A method for manufacturing an outsole for use in footwear, the method comprising the steps of:
mixing a composition of internal mold lubricant with a composition of a footwear;
forming the mixture to manufacture the outsole and
forming an outsole from the mixture and wherein the composition of internal mold lubricant consists of a branched hydrocarbon having molecular weight of 800 to 2000, long chain carboxylic acids having molecular weight of 200 to 800, a metal complex of long chain carboxylic acids having molecular weight of 200 to 800, and an ionomer.

* * * * *